(12) United States Patent
Achten et al.

(10) Patent No.: US 11,248,998 B2
(45) Date of Patent: Feb. 15, 2022

(54) METHOD FOR THE MECHANICAL TESTING OF A STRUCTURE FORMED AS ONE PART ON THE BASIS OF TEST PIECES GENERATED BY A 3D PRINTING PROCESS

(71) Applicant: Covestro Deutschland AG, Leverkusen (DE)

(72) Inventors: Dirk Achten, Leverkusen (DE); Thomas Büsgen, Leverkusen (DE); Dirk Dijkstra, Odenthal (DE); Nicolas Degiorgio, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 435 days.

(21) Appl. No.: 16/311,008

(22) PCT Filed: Jun. 20, 2017

(86) PCT No.: PCT/EP2017/065071
§ 371 (c)(1),
(2) Date: Dec. 18, 2018

(87) PCT Pub. No.: WO2017/220567
PCT Pub. Date: Dec. 28, 2017

(65) Prior Publication Data
US 2020/0309656 A1    Oct. 1, 2020

(30) Foreign Application Priority Data

Jun. 24, 2016 (EP) .................................... 16176212

(51) Int. Cl.
*G01N 3/62* (2006.01)
*G01N 3/02* (2006.01)

(52) U.S. Cl.
CPC ................. *G01N 3/62* (2013.01); *G01N 3/02* (2013.01)

(58) Field of Classification Search
CPC . G06F 30/23; G01N 3/62; G01N 3/02; G01N 2203/0298; G01N 1/2806;
(Continued)

(56) References Cited

U.S. PATENT DOCUMENTS 8,489,368 B2 * 7/2013 Klimmek ................ G06F 30/23
703/2
10,488,309 B2 * 11/2019 Slaughter ................ G01N 3/62
(Continued)

FOREIGN PATENT DOCUMENTS

CN        104515696 A      4/2015
DE     102014116127    *  5/2016
(Continued)

OTHER PUBLICATIONS

International Search Report for PCT/EP2017/065071 dated Oct. 12, 2017.
(Continued)

*Primary Examiner* — Octavia Hollington
(74) *Attorney, Agent, or Firm* — Jed C. Benson

(57) ABSTRACT

The invention relates to a method for the mechanical testing of a structure (1, 10) formed as one part, comprising the following steps: a) identifying a sub-element (2, 11) in the structure (1, 10) formed as one part for generating a test element (3, 3') that is intended to undergo mechanical testing, wherein the sub-element (2, 11) only represents a portion of the structure (1, 10) formed as one part, b) determining the spatial-geometrical structure of the sub-element (2, 11), c) generating the test element (3, 3') on the basis of the spatial-geometrical structure of the sub-element (2, 11) and at least in part or in full by way of a 3D printing process, d) carrying out at least one mechanical test on the test element (3, 3') generated. A further subject matter of the present invention is a method for modifying the structural
(Continued)

Figure 1:
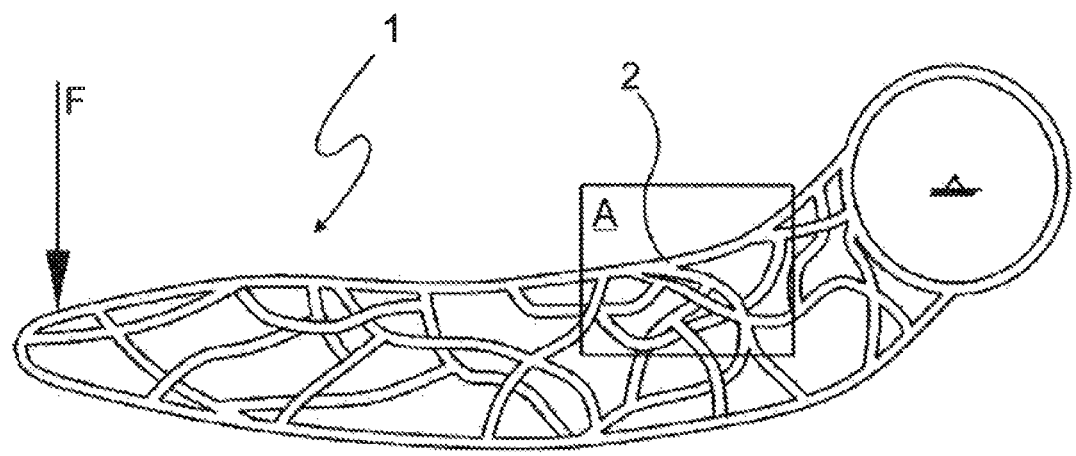

design data of the structure (1, 10) formed as one part, in which the data of the mechanical testing that is obtained from the aforementioned method is used for a modification of the structural design data of the structure (1, 10).

17 Claims, 3 Drawing Sheets

(58) Field of Classification Search
CPC . G01N 1/00; G01N 3/00; G01N 33/00; B29C 67/00; B33Y 80/00
USPC .......................................................... 73/804
See application file for complete search history.

(56) References Cited

U.S. PATENT DOCUMENTS

| | | | |
|---|---|---|---|
| 10,976,722 B2* | 4/2021 | Radjou | .............. G05B 19/4099 |
| 2011/0137578 A1 | 6/2011 | Dietrich et al. | |
| 2014/0030487 A1* | 1/2014 | Boyce | ..................... B32B 27/06 |
| | | | 428/161 |
| 2014/0037873 A1* | 2/2014 | Cheung | ..................... B64C 1/06 |
| | | | 428/34.1 |
| 2014/0184594 A1* | 7/2014 | Janvier | ................. G06T 17/005 |
| | | | 345/420 |
| 2015/0073730 A1* | 3/2015 | Messina | .................... G01N 3/00 |
| | | | 702/42 |
| 2015/0154321 A1 | 6/2015 | Schmidt et al. | |
| 2015/0278414 A1* | 10/2015 | Zhou | ....................... G06F 30/23 |
| | | | 703/2 |
| 2016/0125107 A1* | 5/2016 | Druckman | .............. G06F 30/23 |
| | | | 703/2 |

FOREIGN PATENT DOCUMENTS

| | | |
|---|---|---|
| DE | 102014116127 A1 | 5/2016 |
| JP | S63285466 A | 11/1988 |
| WO | WO-2014066538 A1 | 5/2014 |

OTHER PUBLICATIONS

Written Opinion of the International Searching Authority for PCT/EP2017/065071 dated Oct. 12, 2017.

* cited by examiner

METHOD FOR THE MECHANICAL TESTING OF A STRUCTURE FORMED AS ONE PART ON THE BASIS OF TEST PIECES GENERATED BY A 3D PRINTING PROCESS

CROSS-REFERENCE TO RELATED APPLICATIONS

This application is a national stage application (under 35 U.S.C. § 371) of PCT/EP2017/065071, filed Jun. 20, 2017, which claims benefit of European Application No. 16176212.5, filed Jun. 24, 2016, both of which are incorporated herein by reference in their entirety.

The invention relates to a method for the mechanical testing of a structure formed as one part, comprising the following steps:

a) identifying a sub-element in the structure formed as one part for generating a test element that is intended to undergo mechanical testing, wherein the sub-element only represents a portion of the structure formed as one part, b) determining the spatial-geometrical topology of the sub-element, c) generating the test element on the basis of the spatial-geometrical topology of the sub-element at least in part or in fill by way of a 3D printing process, d) carrying out east one mechanical test on the test element generated.

A further subject matter of the present invention is a method for modifying the structural design data of a structure formed as one part, in which the data of the mechanical testing that is obtained from the aforementioned method is used for a modification of the structural design data of the structure.

Methods for the material testing of individual regions from a larger structure are sufficiently well known from the prior art. For this purpose, the corresponding regions at which particularly high mechanical loads are to be expected are removed by customary methods, for example by sawing out or cutting out. The regions removed are then subsequently made to undergo mechanical loading tests, which correspond to mechanical loads that typically occur at this location. In this way it is possible to investigate the mechanical behavior of a larger structure, which for example would be too large to investigate it in its entirety in a testing machine. If these tests are carried out at a number of critical locations of the component, the load-hearing capacity of the overall structure can be concluded in approximation on the basis of the results.

Components are increasingly being developed and designed by computer. The computer-aided design and simulation software proposes optimized geometries on the basis of the functional specifications, such as the layout of the mechanical forces, temperature flows and electrical currents acting on the component. Many of these optimized geometries cannot be efficiently produced any longer by conventional production processes such as are known for the processing of plastics and metals (injection molding, extrusion, casting, cold forming, etc.). To an increasing extent, additive and subtractive manufacturing technologies are being used for producing series products with optimized component geometries.

The testing of increasingly complex components will in future take place mainly in the computer on the basis of property simulations. Even today, the aforementioned commonly used testing methods on classic test pieces are not always suitable for generating data for a reliable prediction of permitted load cycles and critical failure parameters. Current testing geometries and testing methods are increasingly losing their relevance for the testing and prediction of highly complex components. Therefore, often the components as a whole must undergo testing. Especially for components that are only to be produced in small batches or even as one-offs, however, destructive component testing is not economically efficient.

Suitable methods of analysis for the identification of possible weak points are known from the prior art. Thus, WO 2014/066538 describes such a method in which a so-called "Weak Spot Analysis" is performed on three-dimensional objects. The method described there is suitable for the production of 3D-printed components or their expected mechanical load-bearing capacity.

US 2015/0154321 A1 discloses a method for producing 3D-printed objects in which the structure of the three-dimensional object is first divided mathematically into two-dimensional areas and the mechanical properties thereof are calculated by means of a simulation. The results of this calculation are then in turn used for controlling the 3D printing process, in order in this way to improve the stability of the structure overall.

The methods known from the prior art are affected by various disadvantages. In the case of the methods in which the structure as a whole is in each case made to undergo mechanical tests, it may prove to be disadvantageous that a new test structure has to be generated for each individual test. Moreover, sometimes there is the problem here that the locations that are possibly critical cannot be optimally clamped into a test apparatus. Moreover, some structures to be investigated may also be problematic with regard to their size for investigation in customary testing machines. The larger testing machines necessary for this are expensive to procure, which can make the test procedure as a whole very costly. In particular, the increasingly complexly designed components can no longer be tested in an economically acceptable way with the methods known so far.

In the case of other methods, in which parts are cut out from the overall structure in order to investigate these parts separately, there is often the problem that cutting out already causes mechanical changes that can influence the mechanical behavior of this sub-segment to occur at the edge regions. What is more, with different testing machines it is necessary to attach appropriate connecting elements to the test piece to be investigated in order to be able to load the test piece into the testing machine in the first place. Depending on the material, the attachment of these holding elements may be problematic, because for example welding onto the test piece may cause local changes in the microstructure, which could ultimately have an influence on the test result. To this extent, the measurement results could be falsified by this.

One object of the present invention is to improve at least some of the disadvantages of the prior art at least partly. Another object of the present invention is consequently to provide a method for the mechanical testing of a structure formed as one part that allows a rapid and low-cost investigation of sub-regions of the structure at which particular mechanical loads are to be expected. These are intended in particular to be mechanical loads relevant to component failure. The method is preferably also intended to offer the possibility of investigating sub-regions of the structure separately, and thereby make it possible to attach connecting elements for different testing machines in a way that as far as possible does not bring about any changing of the mechanical properties of the sub-portion to be investigated itself. It is intended that it should preferably be possible for the method still to be carried out economically even in the case of complexly designed components.

The object is achieved by a method for the mechanical testing of a structure formed as one part, comprising the following steps:
a) identifying a sub-element in the structure formed as one part for generating a test element that is intended to undergo mechanical testing, wherein the sub-element only represents a portion of the structure formed as one part,
b) determining the spatial-geometrical topology of the sub-element,
c) generating the test element on the basis of the spatial-geometrical topology of the sub-element at least in part or in full by way of a 3D printing process,
d) carrying out at least one mechanical test on the test element generated.

As provided by the present invention, a structure formed as one part is understood as meaning a three-dimensional body that does not comprise any structural elements that can be reversibly separated from one another, that is to say for example two elements connected to one another by screwing. The structure formed as one part as provided by the present invention may well be made up of different materials or layers of material, as long as these layers cannot be nondestructively separated from one another.

The structure formed as one part as provided by the present invention may of course itself be in turn a component part of a larger object. The structure formed as one part may be connected here to the other components of the larger object by means of all possible joining methods, to be precise both by means of reversible and irreversible connecting techniques, such as for example welding, adhesive bonding or plugging or screwing. Thus, a structure formed as one part as provided by the present invention may for example be the heel portion of a sole of a shoe. This may then be welded to the front portion of the sole to complete the larger object, that is to say the complete shoe, and be connected to the upper part of the shoe.

The present invention is based on the realization that for example regions relevant to failure of the structure formed as one part can be easily and inexpensively replicated by means of 3D printing processes and mechanical investigations can be carried out on them. It is not even necessary here that the structure formed as one part is made up of the same material as the 3D-printed test element. Thus, for example, it is conceivable that a reinforcing structure, such as for example the aluminum frame of an aircraft, is replicated in sub-regions by means of a 3D printing process to generate a corresponding test element and this region is then made to undergo mechanical tests. Even if aluminum and the plastic used in the 3D printing have different mechanical properties, it is nevertheless possible with knowledge of the fundamental mechanical differences for conclusions concerning the mechanical behavior of the aircraft frame in this region to be drawn.

The results from these investigations can go back as data into the design of the structure, in order to supplement the calculated properties by the properties measured during the testing, in order thereby to newly carry out the optimizing of the geometry. In this case, the cycle of computer-generated design, identification of critical component regions, that is to say corresponding sub-elements, production of a corresponding test element, testing of the test element produced in the desired production process of the component region with respect to the predetermined critical failure parameters and feedback of data from the component testing into the computer-generated design of the structure may, if required, be carried out a number of times and, in the course of the optimization, new critical regions in the component may be detected and 3D-printed, tested and in turn fed back into the optimization. In this case, multimaterial solutions are also possible as a result.

Consequently, a further subject matter of the present invention is a method for modifying the structural design data of a structure formed as one part, in which
i) the structure formed as one part is first made to undergo a method according to the invention for mechanical testing,
ii) the data of the mechanical testing are subsequently used for modifying the structural design data of the structure formed as one part and
iii) optionally, a modified structure is generated on the basis of the modified structural design data,
steps i) to iii) preferably being repeated at least once.

In the case of the method according to the invention for mechanical testing, it is provided that the generation of the test element on the basis of the spatial-geometrical topology of the sub-element can be performed at least partly or completely by means of a 3D printing process. Partial generation of the test element by means of a 3D printing process is appropriate in particular whenever the structure of the sub-element has likewise been generated partly in a conventional way and partly by means of 3D printing. Thus, for example, a 3D-printed shoe cap may be bonded to an injection-molded TPU sole by means of an adhesive. The shoe cap could be generated by means of 3D printing as the sub-element relevant to component failure, bonded in the aforementioned way onto a portion of the TPU sole corresponding to the sub-element and tested for example for bonding failure in the 180° pull-off test.

Particularly advantageously in the case of the method according to the invention for mechanical testing, an adapter element that is suitable for being coupled to a device for mechanical testing may be provided on the test element. In this case, the adapter element is generated in a particularly preferred way by means of a 3D printing process. This is of advantage because, as a result, the test element is not subjected to any thermal or other loads that could change its mechanical behavior. In a particularly preferred way, the adapter element is performed directly in one work step with the generation of the test element itself. This is particularly advantageous, because in this way the test element and the adapter element or elements provided on it form a mechanical unit, so that the results of the testing of the test element are not changed in practice by the adapter elements.

The spatial configuration of the adapter elements is based substantially on the requirements for and loads on the testing machine. They are expediently to be designed such that they fit optimally into the connection possibilities of the testing machine and on the other hand behave "inertly" in the mechanical tests. This is understood as meaning that, in particular in the mechanical tests, the connecting elements should not exhibit any material failure and, for example in flexural tests, should not appreciably bend along with the test piece. In the case of dynamic investigations, such as for example in the measurement of the modulus of elasticity, the connecting elements should likewise not exert any influence here on the measurement result. The adapter element may for example be selected from lugs, eyelets, pins, butt straps, cylinders, grippers, holders, threads, meshes, in particular from forms that can be connected to classic mechanical testing machines securely and appropriately in terms of measurement.

In an advantageous configuration of the method according to the invention for mechanical testing, at least two adapter elements are provided. This is generally expedient, because in most mechanical test apparatuses test pieces have to be clamped in at two locations. The adapter elements may be positioned here at opposite ends or else at the same end of the test element, depending on which mechanical tests are to be carried out and at which locations the testing machine provides the presence of clamping-in possibilities.

According to a preferred embodiment of the method according to the invention for mechanical testing, the adapter elements are positioned at points of application of the force vectors at which in particular mechanical loads relevant to component failure on the structure formed as one part are to be expected. It can in this way be ensured that the test element is made to undergo the mechanical test in such a way that mechanical loading is also to be expected on the structure formed as one part. The mechanical loading relevant to component failure may be determined by means of various mathematical simulation calculations, preferably by means of an FEM load and failure simulation, also called FEM simulation of load and failure.

As already stated above, a structure formed as one part may in principle be made up of any conceivable material. In an advantageous configuration, the structure may have been generated at least in part by means of a 3D printing process. Here, the sub-element is preferably located completely within the region that has been generated by means of 3D printing processes. In this way, specifically a sub-region that has likewise been generated by means of a 3D printing process can be investigated. In a particularly advantageous configuration of this embodiment of the method according to the invention, the same 3D printing process that was used for printing at least part of the structure is used for printing the test element. It can in this way be ruled out that the results of the mechanical tests on the test element are attributable to a different 3D printing process.

The determination of the spatial-geometrical topology of the sub-element may be based on all the methods known to a person skilled in the art. Thus, the determination of the spatial-geometrical topology of the sub-element may be performed on the basis of the structural design data, in particular the CAD data. As an alternative, and in particular whenever such structural design data are not available, the results of an at least partial structural analysis may be used, such as for example by means of a tomographic layer-imaging process, in particular by means of electron, ion or x-ray analysis, nuclear magnetic resonance analysis (NMR), ultrasonic analysis and/or tetrahertz techniques on the structure formed as one part.

The mechanical tests used as part of the method according to the invention for mechanical testing are in principle not subjected to any restriction and are preferably directed to the loads to be expected. Thus, the mechanical testing on the test element may for example be selected from a tensile, compressive, flexural, shearing, tearing and vibration resonance test, from a test for determining the modulus of elasticity, from dynamic mechanical tests for determining the material fatigue, from thermal, oxidation, aging and swelling tests also in combination with mechanical and fatigue tests, in particular under various temperatures, oxidative or reductive conditions, in the presence of acids, alkalis, organic and inorganic solvents, lubricants, greases, oils, fuels and/or water or a number of the aforementioned tests.

According to the invention, it is provided in the case of the method for mechanical testing that the generation of the test element is performed by means of a 3D printing process. The 3D printing process may for example be selected from melt layering (Fused Filament Fabrication, FFF), ink-jet printing, photopolymer jetting, stereolithography, selective laser sintering, digital light processing based additive manufacturing system, continuous liquid interface production, selective laser melting, binder jetting based additive manufacturing, multijet fusion based additive manufacturing, high-speed sintering process and laminated object modeling.

In an advantageous configuration of the method according to the invention for mechanical testing, the same material as corresponds to that of the sub-element in the structure formed as one part is used in the generation of the test element. In this way, the test results on the test element can be transferred directly to the sub-element of the structure, without a corrective calculation on the basis of the use of different materials having to be carried out for this.

As an alternative to this, however, it is likewise possible that a different material is used in the generation of the test element than corresponds to this sub-element in the structure formed as one part, the results of the mechanical testing on the test element being transferred to the material that corresponds to this sub-element in the structure formed as one part by means of a corrective calculation. As an alternative or in addition to this, the test element may be generated in a different size than the sub-element in the structure formed as one part by means of a size scaling, the results of the mechanical testing on the test element being transferred to the size that corresponds to this sub-element in the structure formed as one part by means of a corrective calculation.

The identification of the sub-element in the structure formed as one part may be performed in various ways. In the case of simple structures, these regions may in the simplest case be identified by optical assessment and on the basis of experience. Equally, identifications of the sub-element in the structure formed as one part may also be performed on the basis of the result of a simulation calculation, which determines in which regions of the structure formed as one part above-average mechanical loading is to be expected during its use as intended. The simulation calculations customary for this are known to a person skilled in the art. Here, too, the already previously mentioned FEM load and failure simulation, also called FEM simulation of load and failure, may be used.

The material of the test element may be selected for example from metals, plastics and composites, in particular from liquid-processable plastics formulations on the basis of polyacrylates, polyepoxides, polyurethanes, polyesters, polysilicons, as well as mixtures and copolymers thereof, from thermoplastically processable plastics formulations on the basis of polyamides, polyurethanes, polyesters, polyamides, polyether ketones, polycarbonates, polyacrylates, polyolefins, polyvinylchloride, polyacrylates, polyoxymethylene and/or crosslinked materials on the basis of polyepoxides, polyurethanes, polysilicons, polyacrylates, polyesters as well as mixtures and copolymers thereof.

In an advantageous configuration of the method according to the invention for mechanical testing, it is also possible for a number of sub-elements of the structure formed as one part to be identified, their spatial-geometrical topology respectively determined and used in each case for generating test elements, which are then respectively made to undergo at least one mechanical test. In this way, the structure formed as one part can be "broken up" into its critical sub-elements relevant to failure, and a suitable mechanical test can be selected for each sub-element as corresponds to the loads occurring during use of the structure as intended.

In the case of the method according to the invention for modifying the structural design data of a structure formed as one part, it is provided that the structural design data of the structure are modified on the basis of the results of the mechanical testing. This modification may concern all of the structural design measures, that is to say for example changes with regard to the spatial-physical configuration, but also the materials used or else combinations thereof.

Figure 2:
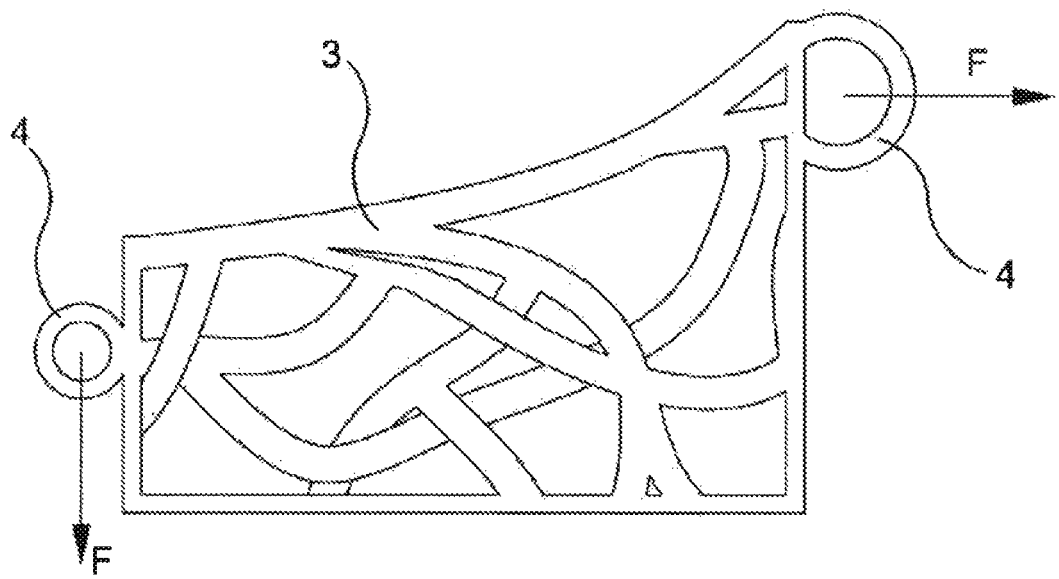
Figure 3:
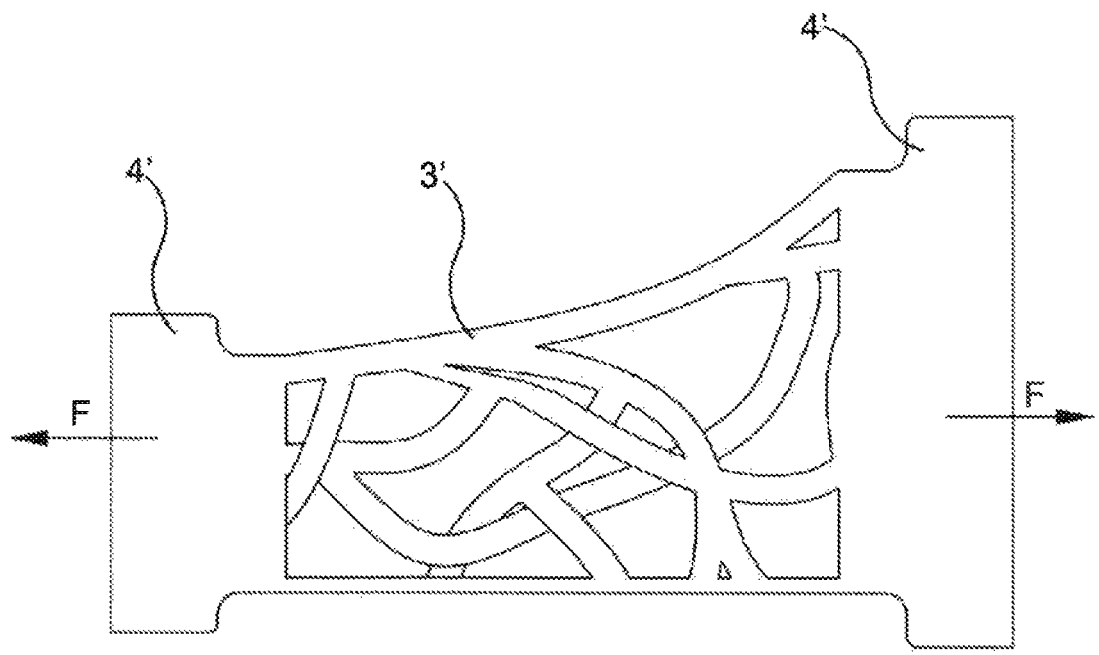
Figure 4:
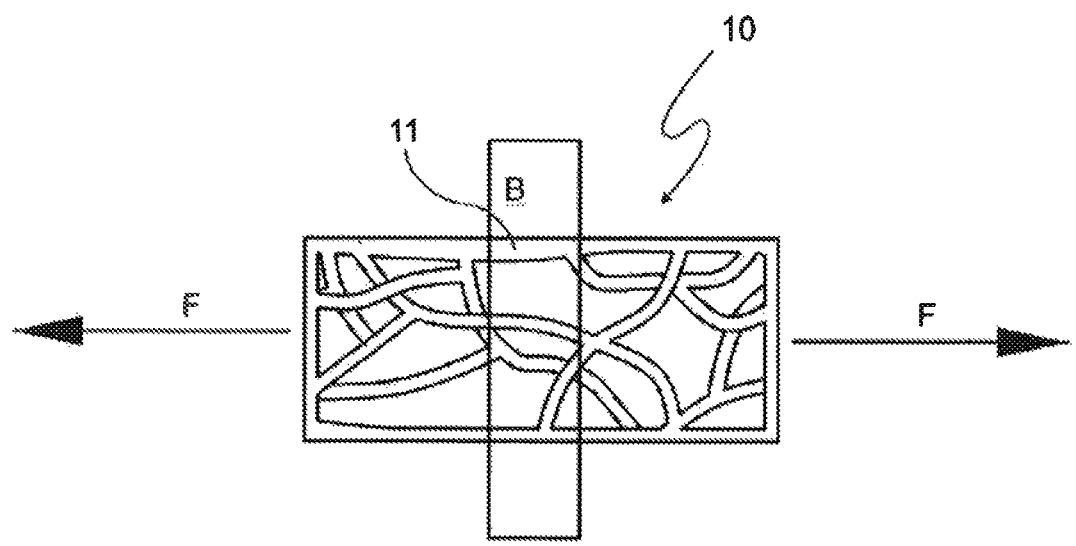
Figure 5:
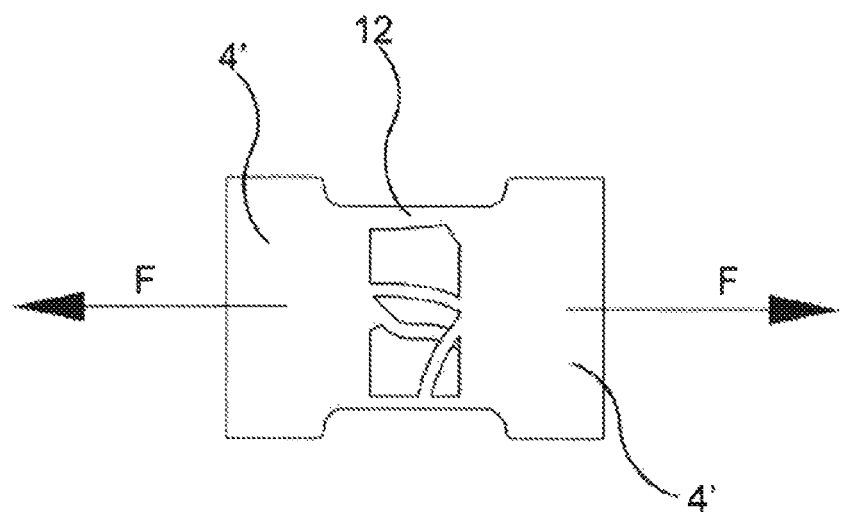

The present invention is explained in more detail below on the basis of FIGS. 1 to 5, in which FIG. 1 shows a first structure formed as one part with a sub-element relevant to component failure, FIG. 2 shows a first test element for the sub-element from FIG. 1, FIG. 3 shows a second test element for the sub-element FIG. 1, FIG. 4 shows a second structure formed as one part with a region relevant to component failure and FIG. 5 shows a test element from the sub-element relevant to component failure from FIG. 4.

In FIG. 1, a structure 1 formed as one part is depicted in the form of a self-supporting seat area in a lateral sectional representation. During use of the structure 1 as intended, a downwardly acting force F occurs in an edge region. This may lead to a failure of the structure in a sub-element 2 of the region A.

To investigate the mechanical resistance, the spatial-geometrical topology of the sub-element 2 is determined and used to generate a test element 3 represented in FIG. 2 by means of a 3D printing process. Provided on the test element 3 at respectively opposite ends are adapter elements 4 in the form of eyelets. The eyelets 4 are generated during the generation of the test element 3 directly when the latter is created in the 3D printing process, in other words they are not separately attached. The test element 3 can be clamped into a testing machine with the aid of the eyelets 4 and subjected to tensile forces along the force vectors F, in order thus to determine the mechanical load-bearing capacity of the test element 3, and consequently of the sub-element 2 of the structure 1 corresponding to it.

In FIG. 3, a further test element 3', which has been generated from the sub-element 2 by means of a 3D printing process, is represented. On the test element 3', adapter elements are provided at opposite ends in the form of butt straps 4', which are generated directly with the generation of the test element 3' by means of 3D printing processes. At the butt straps 4', the test element 3' can be clamped into a tensile testing machine and subjected to tensile forces along the force vectors F to tensile forces.

In FIG. 4, a further structure 10 formed as one part is depicted. During use as intended, the structure 10 is loaded primarily with tensile forces F in opposite directions. An FEM load and failure simulation, also called FEM simulation of load and failure, is used to determine in the region B a sub-element 11 at which the structure 10 is probably most likely to exhibit component failure.

On the basis of the structural design data, the spatial-geometrical topology of the sub-element 11 is determined from it and is used to generate a test element 12 by means of a 3D printing process. On the test element 12, adapter elements 4' are provided at opposite ends in the form of butt straps, which are generated directly with the generation of the test element 12 by means of the 3D printing process. With the aid of the butt straps 4', the test piece 12 can be clamped into a tensile testing machine and its mechanical behavior investigated.

On the basis of the load-bearing capacities of the respective sub-elements 2, 11 that are determined by means of the mechanical test, an alteration of the structural design of the structures 1, 10 can for example be performed in the sub-elements 2, 11, in order that the structures 1, 10 can be exposed to higher loads in the regions A, B without component failure of the structures 1, 10 occurring.

Some specific application examples of the method according to the invention are described below:

1. 3D-Printed Mattress:

To investigate a 3D-printed mattress, that is to say a structure as provided by the present invention, the regions that are subjected to the greatest loading are selected as sub-elements from its digital design, for example the regions that support the lumbar part of the spine, various three-dimensional regions, for example cuboids, with preferably a three-dimensional internal structure such as a framework structure or spring elements. In a way corresponding to the method according to the invention, test elements are generated from these sub-elements and additionally provided with adapter elements, which are preferably generated by means of the same 3D printing process as is used for producing the mattress as a whole. Subsequently, the test elements are investigated with respect to compression set, compressive modulus, shear modulus, damping under dynamic compression and shearing. Media resistances (swelling, discoloration) are also tested on these test elements, as well as how the previously tested mechanical properties change after they are kept for example in urine, cleaning agents or detergent solutions. The data obtained front the tests are fed back into the material selection specifications and, with these values, the design is newly optimized iteratively by the simulation software. If required, new test elements are generated as described above from the newly optimized digital design and are in turn tested in the specified procedure until no significant optimization is achieved any longer between two successive testing and optimizing steps.

2. 3D-Printed Shoe Sole:

To investigate a 3D-printed shoe sole, that is to say a structure as provided by the present invention, the regions that are subjected to the greatest compressive and shear loading are selected as sub-elements from its digital design, for example regions at the heel, and from the regions subjected to the greatest abrasive loading, for example in the region of the toe cap, various three-dimensional regions, for example cuboids, with preferably a three-dimensional internal structure such as a framework structure or spring elements. In a way corresponding to the method according to the invention, test elements are generated from these sub-elements and additionally provided with adapter elements, which are preferably generated by means of the same 3D printing process as is used for producing the shoe sole as a whole. Subsequently, the test elements are investigated with respect to damping, abrasion, tear propagation resistance, compression set, shear modulus, damping under dynamic compression and shearing as well as hardness, weathering and media resistance (washing resistance, oil resistance). The data obtained from the tests are fed back into the material selection specifications and, with these values, the design is newly optimized iteratively by the simulation software. If required, new test elements are generated as described above from the newly optimized digital design and are in turn tested in the specified procedure until no significant optimization is achieved any longer between two successive testing and optimizing steps.

3. T-shirt with Imprint:

A T-shirt with an imprint, for example with a logo that has been generated by means of FDM, is to be investigated. The logo corresponds here to the structure as provided by the present invention. From its thinnest regions/letters, and consequently regions subjected to the greatest loading with respect to wear, a tear-off test and abrasion test (Taber) is to be performed an investigation of washing resistance and oil resistance with respect to discoloration and changing of mechanical properties analogous to the method described above. The data obtained from the tests are fed back into the material selection specifications and, with these values, the design is newly optimized iteratively by the simulation software. If required, new test elements are generated as described above from the newly optimized digital design and are in turn tested in the specified procedure until no significant optimization is achieved any longer between two successive testing and optimizing steps.

4) Automobile Structural Element:

From an automobile structural element, that is to say a structure as provided by the present invention, subelements are selected from its three-dimensional digital design. Automobile structural elements of interest are for example crash structures or regions of the bodywork, in particular from the front structure of the hood, that preferably have a three-dimensional internal structure, such as a framework structure. In a way corresponding to the method according to the invention, test elements are generated from these sub-elements and additionally provided with adapter elements, which are preferably generated by means of the same 3D printing process as is used for producing the structure in this region. The test elements are subsequently investigated with respect to indentation resistance, torsional stiffness, resonant frequency, vibration fatigue and crash resistance. The data obtained from the tests are fed back into the material selection specifications and, with these values, the design is newly optimized iteratively by the simulation software. If required, new test elements are generated as described above from the newly optimized digital design and are in turn tested in the specified procedure until no significant optimization is achieved any longer between two successive testing and optimizing steps.

LIST OF DESIGNATIONS

1 Structure
2 Sub-element
3 Test element
3' Test element
4 Eyelet
4' Butt strap
10 Structure
11 Sub-element
12 Test element

The invention claimed is:

1. A method for the mechanical testing of a structure formed as one part, comprising the following steps:
 a) identifying a sub-element in the structure for generating a test element that is intended to undergo mechanical testing, wherein the sub-element only represents a portion of the structure, and wherein identifying the sub-element in the structure formed as one part comprises performing a simulation calculation to determine in which regions of the structure formed as one part that above-average mechanical loading is expected during the intended use of the structure formed as one part,
 b) determining the spatial-geometrical topology of the sub-element,
 c) generating the test element on the basis of the spatial-geometrical topology of the sub-element at least in part or in full by way of a 3D printing process,
 d) carrying out at least one mechanical test on the test element generated.

2. The method as claimed in claim 1, wherein at least one adapter element that is suitable for being coupled to a device for mechanical testing is provided on the test element.

3. The method as claimed in claim 2, wherein the adapter element is generated by means of a 3D printing process in one work step with the generation of the test element.

4. The method as claimed in claim 2, wherein the adapter element comprises a lug, an eyelet, a pin, a butt strap, a cylinder, a gripper, a holder, threads, meshes, or a combination thereof.

5. The method as claimed in claim 2, wherein at least two adapter elements are provided.

6. The method as claimed in claim 2, wherein the adapter elements are positioned at points of application of the force vectors at which mechanical loading relevant to component failure on the structure formed as one part is expected.

7. The method as claimed in claim 1, wherein the structure formed as one part is at least partly 3D-printed.

8. The method as claimed in claim 7, wherein the 3D printing process for printing the test element corresponds to that by which the structure formed as one part is at least partly printed.

9. The method as claimed in claim 1, wherein the determination of the spatial-geometrical topology of the sub-element is performed on the basis of the structural design data.

10. The method as claimed in claim 9, wherein the structural data comprises CAD data and/or the results of an at least partial structural analysis of the structure formed as one part.

11. The method as claimed in claim 10, wherein the at least partial structural analysis comprises a tomographic layer-imaging process comprising electron analysis, ion analysis, x-ray analysis, nuclear magnetic resonance analysis, ultrasonic analysis, tetrahertz techniques, or a combination thereof.

12. The method as claimed in claim 1, wherein the mechanical testing on the test element comprises a tensile test, a compressive test, a flexural test, a shearing test, a tearing test, a vibration resonance test, a test for determining the modulus of elasticity, a dynamic mechanical test for determining the material fatigue, a thermal test, an oxidation test, an aging test, a swelling test, or a combination thereof.

13. The method as claimed in claim 1, wherein the same material as corresponds to that of the sub-element in the structure formed as one part is used in the generation of the test element.

14. The method as claimed in claim 1, wherein
 a) a different material is used in the generation of the test element than corresponds to the sub-element in the structure formed as one part, the results of the mechanical testing on the test element being transferred to the material that corresponds to the sub-element in the structure formed as one part by means of a corrective calculation, and/or
 b) the test element is generated in a different size than the sub-element in the structure formed as one part by means of a size scaling, the results of the mechanical testing on the test element being transferred to the size that corresponds to the sub-element in the structure formed as one part by means of a corrective calculation.

15. The method as claimed in claim 1, wherein a number of sub-elements in the structure formed as one part are identified, their spatial-geometrical topologies determined and used in each case for generating test elements, which are respectively made to undergo at least one mechanical test.

16. A method for modifying the structural design data of a structure formed as one part, in which
   i) the structure formed as one part is first made to undergo a method for mechanical testing as claimed in claim 1,
   ii) the data of the mechanical testing are subsequently used for modifying the structural design data of the structure formed as one part, and
   iii) optionally, a modified structure is generated on the basis of the modified structural design data.

17. The method as claimed in claim 16, wherein steps i) to iii) are repeated at least once.

\* \* \* \* \*